Feb. 5, 1957

L. DIETCH 2,780,749

RASTER CENTERING CONTROL

Filed Feb. 9, 1955

INVENTOR.

LEONARD DIETCH

BY

ATTORNEY 2,780,749

RASTER CENTERING CONTROL

Leonard Dietch, Haddonfield, N. J., assignor to Radio Corporation of America, a corporation of Delaware Application February 9, 1955, Serial No. 487,099

10 Claims. (Cl. 315—27)

The invention relates to television deflection systems and particularly to means for centering a raster formed by an electron beam in a cathode ray tube.

This application describes an improvement over the arrangements shown and described in my U. S. Patent Number 2,743,381.

In present television practice, an image is formed on the fluorescent screen of a cathode ray tube, or kinescope, by an electron beam which is deflected to trace successive lines forming a raster on the fluorescent screen. Deflection of the electron beam may be accomplished electrostatically or magnetically. Magnetic deflection is obtained by applying a sawtooth wave of current to the windings of a deflection system mounted in a yoke arranged about the neck of the cathode ray tube. Sawtooth deflection waves, generated by appropriate circuits in the television receiver, are amplified by a power amplifier output tube and are impressed upon an output transformer and thence upon the deflection windings.

Direct current flow in the output transformer results from the anode current of the output tube which is connected to an energizing potential source by way of a path including a portion of the output transformer winding and a damper tube circuit. This direct current flow has a detrimental effect of saturating the magnetic core material of the output transformer, which necessitates increasing the size of the transformer core and thereby increasing the cost.

Centering of the scanned raster may be accomplished by controlled flow of direct current in the deflection windings. Direct current flow through the output transformer windings will tend either to further saturate the transformer core or to desaturate the core, depending upon the direction of current flow with respect to the flow of the anode current from the output tube. It is desirable to permit direct current to flow through the deflection windings in either direction as dictated by the centering requirements. On the other hand, direct current flow through the output transformer should be limited to the direction in which adverse saturation effects are minimized.

An object of the invention is to provide an improved means for insertion of centering current into the deflection windings without adversely affecting saturation of the output transformer.

A further object of the invention is to provide an improved circuit employing the anode current of the output and damper tubes to accomplish raster centering, and thereby eliminate the need for a separate direct current source.

Another object is to provide an improved circuit which will permit direct current flow in either direction through the deflection windings, but which will limit the direct current flow to a single direction through the output transformer.

According to the invention, a portion of the output transformer, an inductive choke, a potential dividing resistor and a balancing resistor are interconnected in a closed loop to form a direct current bridge circuit. Direct current is applied across the potential dividing resistor forming two arms of the bridge and across the transformer winding and the choke forming the other arms of the bridge. The deflection windings are connected across the bridge from the point between the transformer and the choke to the variable contact of the potential dividing resistor. Centering current through the deflection windings may flow in either direction, but through the output transformer current flow is limited to the direction in which the effect upon the saturation of the transformer core tends to cancel, or "buck out," the saturation resulting from the flow of anode current from the output tube through another portion of this transformer to the damper tube.

Direct current is obtained from the cathode of the damper tube, the anode of which is connected to an inductive linearity control that is tapped at the center for connection to a capacitor for coupling the linearity control for A. C. to the low voltage ends of the deflection winding and the transformer winding.

In order that the practical aspects of the invention will be fully appreciated and readily put to practice, an express embodiment is described hereinafter with reference to the accompanying drawing in which.

In the drawing similar elements in different figures are designated by the same numeral.

Figure 1:
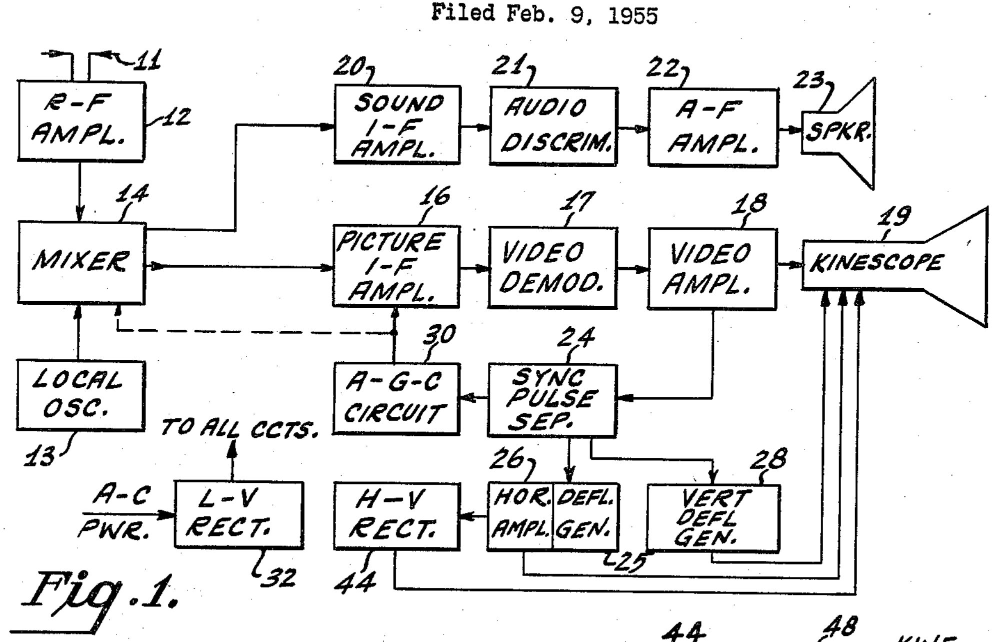
Fig. 1 shows a functional diagram of a television receiver including a horizontal deflection circuit in accordance with the invention.

Referring to Fig. 1 there is shown a functional diagram of a television receiver incorporating a horizontal deflection circuit according to the invention and which may otherwise comprise circuits which may be entirely conventional. In such a receiver television signals appearing at an antenna 11 are applied to a radio frequency wave amplifying circuit 12 and the output therefrom is applied along with a wave obtained from a local beat oscillation generating circuit 13 through a frequency changing circuit 14. The output of the frequency changing circuit is applied either to an intermediate frequency (I.–F.) amplifier amplifying both picture and sound I.–F. signals (not shown); or directly to an individual picture intermediate frequency amplifying circuit 16 as shown and a sound intermediate frequency amplifying circuit 20. A demodulating circuit 17 is coupled to the intermediate frequency amplifying circuit 16 for deriving a video wave from the television signals. The detected video signals are amplified in a video frequency amplifying circuit 18 and thereafter applied to the input circuit of an image reproducing device, or kinescope 19. Sound signals are derived from the frequency changing circuit 14 as shown or from the demodulating circuit 17, for further processing in a sound intermediate frequency amplifying circuit 20, an aural signal discriminating circuit 21, an audio frequency amplifying circuit 22 and a transducer, usually in the form of a speaker 23. The output of the video amplifying circuit 18 is also applied to a synchronizing separating circuit 24 to separate the synchronizing pulses from the image information and the vertical synchronizing pulses from the horizontal. The separated vertical synchronizing pulses are applied to a vertical deflection wave generating circuit and the horizontal synchronizing pulses are applied to a horizontal deflection frequency wave generating circuit 25 coupled to a horizontal wave amplifying circuit 26. A high voltage generating circuit 44 may be coupled to the horizontal deflection wave amplifying circuit 26, and the vertical deflection generating circuit, the horizontal deflection wave amplifying circuit 26, and high voltage generating circuit 44 are coupled to the kinescope 19 to furnish the necessary vertical and horizontal deflection wave and second anode, or ultor, potentials. A low voltage power supply usually connected to the local A.-C. power line is connected to furnish direct energizing potentials to all circuits including the horizontal deflection wave amplifying circuit 26 with the positive pole at the terminals marked with the plus sign and the negative pole at ground. An automatic gain control voltage generating and distributing circuit 30 is coupled to the synchronizing pulse separating circuit 24 or to the video frequency demodulating circuit 18, to supply automatic gain control voltage to the picture intermediate frequency amplifying circuit and others of the circuits previously mentioned as desired. Usually the radio frequency and the intermediate frequency circuits are at least so supplied.

Figures 2, 3:
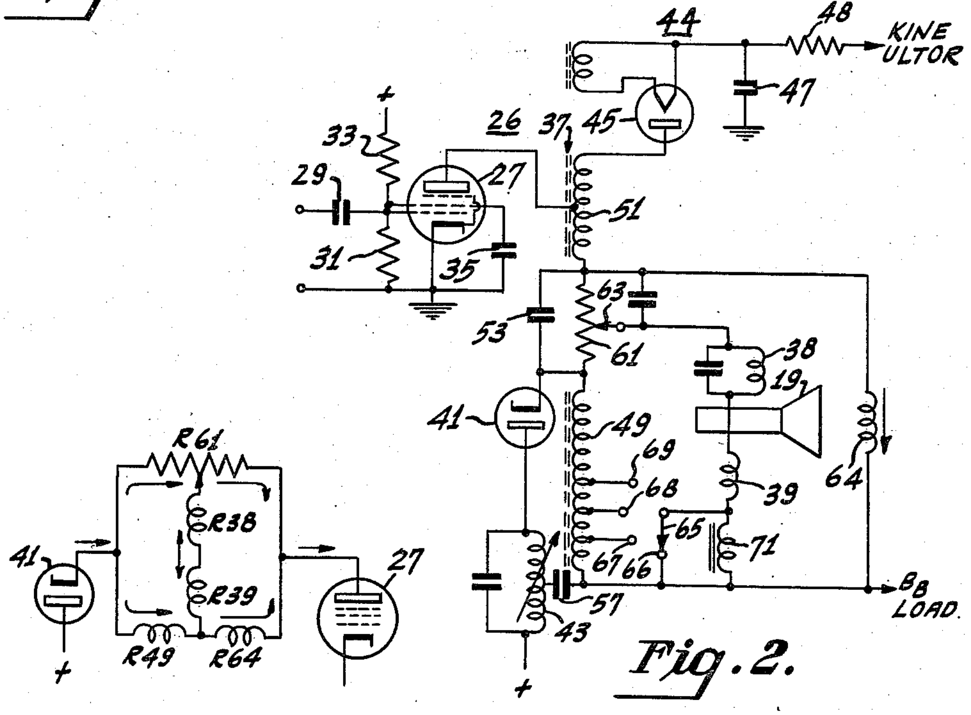
Fig. 2 is a schematic diagram of the horizontal deflection circuit according to the invention.
Fig. 3 illustrates an equivalent direct current bridge network showing the direction of current flow through the various circuit elements.

Referring to the schematic diagram of Fig. 2 shows an embodiment of a circuit according to the invention for centering the raster of a kinescope in the horizontal direction. Sawtooth deflection waves from the horizontal deflection wave generating circuit 25 are impressed on the control grid of a horizontal output amplifier tube 27 by a capacitive coupling 29. A grid resistor 31 provides the control grid with a proper bias. Direct energizing potential is applied to the screen grid by a resistor 33 which is bypassed to ground by a capacitor 35.

Deflection waves of current from the output tube 27 are impressed upon the output transformer 37 and thence upon the horizontal winding comprising two sections 38, 39 of the deflection yoke. Oscillations which would appear in the output transformer 37 are damped out by the damper tube 41 which is connected to the direct energizing voltage supply through a linearity control 43. High voltage pulses appearing in the output transformer are rectified in the high voltage rectifier circuit 44 by a high voltage rectifier tube 45 and the energy is stored by a capacitor 47 to provide the ultor of the kinescope 19 with a continuous high voltage through a series resistor 48. The output transformer 37 is essentially an autotransformer, and the low voltage portion 49 of the winding is coupled for the flow of alternating current from the high voltage portion 51 of the winding by a capacitor 53. The anode current for the output tube 27 flows through the winding portion 51, through a potentiometer resistance element 61 through the damper tube 41 and through the linearity control 43 from a source of positive fixed energizing potential.

The linearity control 43 is tapped and connected for alternating current flow by a capacitor 57 to the end terminal of the low voltage winding portion 49. This capacitor 57 constitutes an energizing voltage boosting, or "B boost" capacitor. It is an advantage of the invention that peak pulse potential on the order of 4 kilovolts may be generated with this circuit for energizing low current drain loads through a high resistance element, as the order of 4 megohms for example. The direct current from the anode of the damper tube 41 must flow from the junction of the winding portion 49 and the resistance element 61 through two parallel connected paths which form a bridge circuit. The potential dividing resistor or potentiometer 61 is one path for direct current flow and forms two arms of the bridge. The second path comprises the low voltage winding portion 49 of the output transformer 37 and an inductive choke winding 64. The horizontal deflection winding portions 38, 39 mounted in the yoke are coupled in series across the bridge connections with a switch arm 65 selectively connecting a contact point 66 between the transformer winding 49 and the choke 64 or contact points 67—69 connected to tapping points on the low voltage winding portion 49, and the adjustable contact 63 of the potentiometer 61.

The bridge network may be better understood by referring to Fig. 3 which is an equivalent direct current circuit of a portion of the deflection circuit illustrated in Fig. 2. Since Fig. 3 deals only with direct currents, all of the circuit elements should be considered as resistance elements although in order to more readily correlate the components the symbol for inductors is used at pertinent points.

It will be appreciated that the anode current from the damper tube 41 flows through two parallel paths. The first path includes the resistance element 61 of the potentiometer. The second path includes a resistance $R_{49}$ representative of the resistive value of the transformer winding 49 and a resistance $R_{64}$ representative of the resistive value of the inductive choke 64. The resistive values of the horizontal deflection winding portions 38, 39 are represented by the coils $R_{38}$ and $R_{39}$ connected across the bridge from the movable contact of the resistance element $R_{61}$ of the potentiometer to the junction between the coils representative of the resistances of the inductive choke 64 and the transformer winding 49.

It will be seen from studying the equivalent circuit of Fig. 3 that the direct current flow will be in a single direction through the winding 49 of the output transformer 37, represented by the coil $R_{49}$. On the other hand it will be appreciated that direct current flow through the deflection windings, represented by the coils $R_{38}$ and $R_{39}$, may be in either direction and may be varied considerably in value by varying the movable contact along the resistance element $R_{61}$ of the potentiometer.

In some instances it may be desirable to add a center balancing resistor equal in value to the difference between the resistive values of the inductive choke 64 and the transformer winding 49 to equalize the arms of the direct current bridge shown in Fig. 3 and thereby bring the balance point of the contact 63 on the resistance element 61 more nearly to the center of travel. This added resistor, if used, should be bypassed by a capacitor to reduce the effect upon the flow of alternating current in the output transformer.

Although the foregoing specification and accompanying drawing disclose the use of a novel bridge circuit employing direct current flow from the damper tube to the output tube, it will be appreciated that a separate direct current source may be used with this bridge circuit to achieve the same result.

While the inductive choke 64 functions as a shunt path for direct current and is one arm of the direct current bridge circuit, it may also be used in an inexpensive circuit as a raster width control. If this inductance is made variable between appropriate values, the loading of the output transformer 37 may be varied and the amplitude of the sawtooth deflection wave as applied to the deflection winding portions 38, 39 may be controlled, thereby controlling the width of the scanned raster. As shown a better method is to use a switch arm 65 to select one of several contact points 66—69 to vary the voltage across the deflection winding while the width choke 71 maintains the loading on the transformer 37 substantially constant without the use of a separate width control windings on the transformer 37, as is required by the prior art arrangements.

The invention claimed is:

1. In a television deflection system having a deflection winding connected to a winding of an output transformer, a raster centering control circuit comprising a potential dividing resistor having two terminals and an adjustable contact, an inductive choke connected between one terminal of said resistor and the connection between said output transformer winding and one terminal of said deflection winding, the other terminals of said resistor being connected to a second winding on said output transformer, the adjustable contact of said resistor being connected to the other terminal of said deflection winding, said potentiometer being operative to vary the direct current flow in said deflection yoke winding without affecting the flow of alternating current in said deflection winding.

2. In a television deflection circuit having a deflection winding coupled to a winding of an output transformer, a bridge circuit for controlling direct current flow in said deflection winding, said bridge circuit comprising an inductive choke winding, a portion of said winding of said output transformer and at least one resistor all connected in series to form a closed loop, a source of direct current connected to one end of said resistor and a load element connected to the other end of said resistor, said deflection winding being coupled across said loop from the connection point between said transformer winding and said inductive choke winding to an adjustable contact on said resistor.

3. In a television deflection system having an output tube coupled to a direct current source by a path capable of passing direct current, a circuit for providing centering current to a deflection winding, said circuit comprising a linearity control and a potentiometer interposed in series in said direct current path, a transformer winding and an inductor connected in series across said potentiometer, a capacitor coupled across said potentiometer for bypassing alternating current around said potentiometer, said linearity control having an inductive winding tapped at the mid-point thereof, a capacitor coupled between the mid-point on said linearity control and the junction between said winding and said inductor, said potentiometer having an adjustable contact coupled to one terminal of said deflection winding, the other terminal of said deflection winding being connected to a point on said transformer winding.

4. In a television deflection system including a direct current path from an anode of an output tube including one output transformer winding portion, a damper tube and an inductive linearity control tapped at the midpoint thereof and connected in series, another output winding portion connected for direct current flow to said one winding portion and to the tap on said linearity control by a direct potential storage capacitor, a circuit for providing centering current to a deflection winding comprising a potentiometer interposed between said winding portions and having an arm, said deflection winding being connected between the arm of said potentiometer and the junction between said storage capacitor and said other winding portion.

5. In a television deflection system, a bridge circuit for providing an adjustable flow of centering current through a deflection winding, said bridge circuit comprising an inductive choke winding, at least a portion of a winding of an output transformer and a potentiometer, said choke winding, a transformer winding, and a potentiometer being interconnected to form a closed loop, a source of direct current connected to the junction of said transformer winding and said potentiometer, and a load element connected to the junction between said inductive choke winding and said potentiometer, said deflection yoke winding being coupled across said loop from a point between said transformer winding and said choke winding to the adjustable contact of said potentiometer.

6. In a system for deflecting an electron beam to trace a raster in a cathode ray tube, a circuit for centering the raster in said cathode ray tube, said circuit comprising an output tube for translating deflection waves, said output tube having an anode circuit capable of passing direct current, a deflection winding adapted to be mounted in a yoke in close spaced relationship to said cathode ray tube, an output transformer coupled between the anode circuit of said output tube and said deflection yoke winding, a damper tube coupled to said output transformer, an inductive linearity control coupled between said damper tube and a source of direct current, the direct current path of said output tube anode circuit including at least a portion of said output transformer winding, said damper tube and said linearity control, said linearity control being tapped at the mid-point thereof, a potentiometer coupled between one terminal of said winding portion of said transformer and a terminal of a second winding portion, said potentiometer forming two arms of a direct current bridge, an inductive choke winding coupled to a second portion of said output transformer winding, said inductive choke winding and said second winding portion of the output transformer being coupled across the open-circuited said potentiometer and forming two other arms of said direct current bridge, said deflection winding being coupled across said direct current bridge from the point between said inductive choke winding and said second portion of the output transformer to the movable contact of the said potentiometer.

7. In a television receiver, a deflection system comprising, means including a transformer winding for deriving a deflection wave, a deflection winding having one terminal connected to one end of said transformer winding, a resistive element having one terminal connected to the other terminal of said transformer winding and a tap at an intermediate point thereon connected to the other terminal of said deflection winding, and an element having a resistance component connected between said one end of said transformer winding and the other terminal of said resistive element to complete a direct current bridge circuit.

8. In a television receiver, a deflection system comprising, means including a transformer winding for deriving a deflection wave and having one end terminal and a plurality of tapping terminals including the other end terminal, a deflection winding having one terminal connected to one of said tapping terminals of said transformer winding, an inductor connected between said one terminal of said deflection winding and said other end terminal of said transformer winding, a resistive element having one terminal connected to said one terminal of said transformer winding and having a tap at an intermediate point thereon connected to the other terminal of said deflection winding, and an element having a resistance component connected between said other end terminal of said transformer winding and the other terminal of said resistive element to complete a direct current bridge circuit.

9. In a television receiver, a deflection system including, an output tube for translating a deflection wave, an output transformer having two winding portions thereon, a resistance element having terminals connected to electrically adjacent terminals of said winding portions, a capacitor for bypassing alternating current around said resistance element, another terminal of one of said winding portions being coupled to said output tube, the other winding portions having a plurality of tapping terminals including the end-terminal remote from said terminal connected to said resistance element, a damper tube having a cathode connected to the last said terminal and an anode, an inductor connected between said anode and a point of fixed energizing potential and having a tapping thereon, a capacitor connected between said tapping and said end-terminal, a deflection winding having an end connected between one of said tapping terminals and an intermediate point on said resistance element, and an inductive element connected between said end-terminals and the terminal of said resistance element connected to said one winding portion.

10. In a television receiver, a deflection system including, an output tube for translating a deflection wave, an output transformer having two winding portions thereon, a resistance element having terminals connected to electrically adjacent terminals of said winding portions, a capacitor for bypassing alternating current around said resistive element, another terminal of one of said winding portions being coupled to said output tube, the other winding portion having a plurality of tapping terminals including the other end-terminal remote from said terminal connected to said resistance element, a damper tube having a cathode connected to the last said terminal and an anode, an inductor connected between said anode and a point of fixed energizing potential and having a tapping thereon, a capacitor connected between said tapping and said other end-terminal, a deflection winding having an end connected between one of said tapping terminals and an intermediate point on said resistance element, an inductor connected between one end of said deflection winding and said other end-terminal of said transformer winding portion, and an inductive element connected between said other end-terminal and the terminal of said resistance element connected to said one winding portion.

References Cited in the file of this patent

UNITED STATES PATENTS

| | | |
|---|---|---|
| 2,470,197 | Torsch | May 17, 1949 |
| 2,477,557 | Torsch | July 26, 1949 |
| 2,707,248 | Goodrich | Apr. 26, 1955 |
| 2,713,652 | Baylor | July 19, 1955 |

FOREIGN PATENTS

| | | |
|---|---|---|
| 533,301 | Great Britain | Feb. 11, 1941 |